United States Patent Office 3,714,677
Patented Feb. 6, 1973

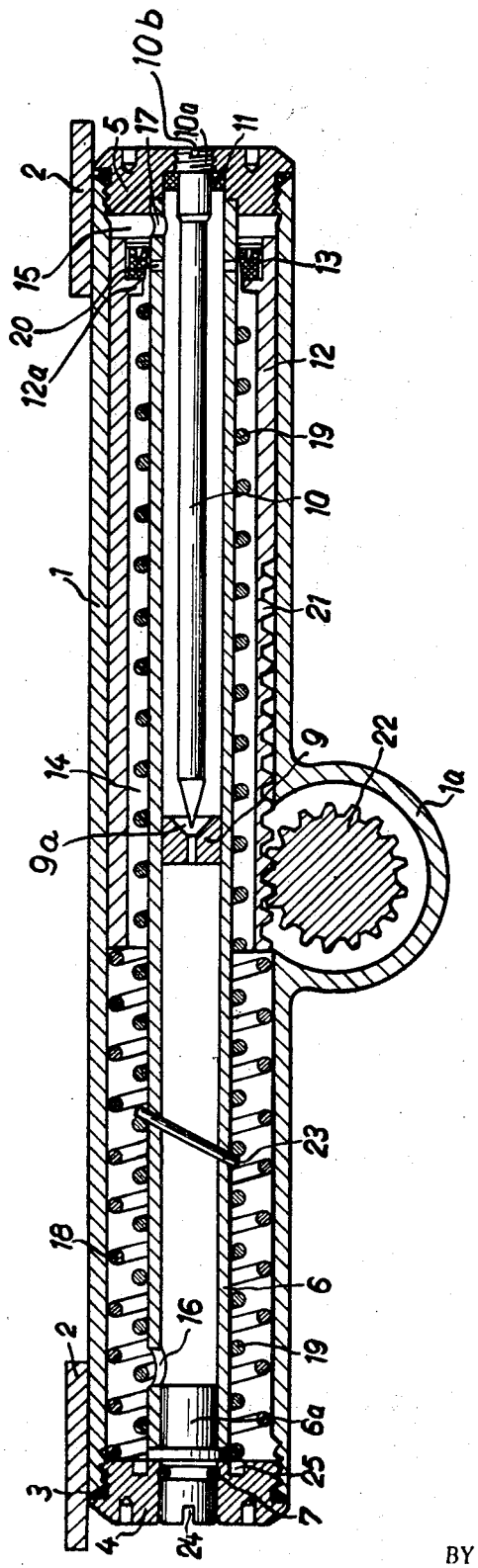

3,714,677
DOOR CLOSING MECHANISM WITH
FLUID BRAKE
Jakob Schmid, Bernstrasse 1647, Aargau, Switzerland
Filed Feb. 24, 1971, Ser. No. 118,296
Claims priority, application Switzerland, Apr. 29, 1970,
6,441/70
Int. Cl. E05f *3/04, 3/14*
U.S. Cl. 16—62                                    8 Claims

ABSTRACT OF THE DISCLOSURE

There is disclosed a door closing mechanism of the type incorporating a fluid brake, and utilizing a piston member which is displaceable by means of at least one helical spring, a rotatable rod being located within such helical spring. Separate adjustment means are provided for the purpose of enabling the helical spring to be adjustably positioned along the rod. According to an important aspect of the invention the adjustment means comprises at least one support means, for instance in the form of a support pin, for the spring, this support pin extending between the windings of the helical spring.

BACKGROUND OF THE INVENTION

The present invention relates to a new and improved door closing mechanism equipped with a fluid brake, and utilizing a piston member which is displaceable under the action of at least one helical spring, a rotatable rod being located within such helical spring, the helical spring being adjustable along such rod with the aid of separate adjustment means.

The prior art is familiar with door closing mechanisms which embody a nut member which can be threaded onto a portion of a rod equipped with threading. The nut member serves to support one end of a helical spring. The other end of this helical spring is rigidly rotatably supported at the piston. In order to alter the pre-bias of such spring the nut member can be axially threaded along the rod. To undertake same, the nut member must be non-rotatably maintained with respect to the housing by means of the non-rotatable spring and the rod must be rotated from the outside, for instance through the use of a screwdriver. The rod end is therefore equipped with an end plug or pin which extends externally out of the housing and to provide the manually actuatable adjustment element is equipped, for instance, with a slot for a screwdriver or with a polygonal portion for engagement by a monkey wrench or other suitable tool. The adjustment possibility of the nut member seated upon the rod is limited at one side by the end of the rod. If the nut member is located at this terminal position then the helical spring possesses the least loading or pre-stress. The other terminal position of the nut member does not present any problem if the piston is provided with sufficiently wide radial play with respect to the rod, so that the nut member can also be axially displaced within the piston. Under those circumstances the adjustment of the nut member for providing up to maximum pre-stress of the spring does not present any particular problem. As already mentioned, the reduction of the spring pre-bias can only occur up to the point of contact of the nut member with the rod end or with the cover of the housing. If the door closing mechanism is only equipped with a single helical spring, then, the nut member can be adjustably displaced towards the rod end such an extent until, for instance, the pre-bias of the spring is removed. The door closing mechanism is then adjusted so that it exerts a very soft closing force.

In order to be able to vary the tolerance or degree of play for adjusting the spring pre-bias, so that heavy doors can also be properly closed, it is known to provide the door closure mechanism with two helical springs situated within one another and operatively coupled in parallel with one another. The inner situated helical spring is the softer spring and the outer situated helical spring is the harder spring. Both helical springs always work together during closing of the door. Therefore, it is not possible to eliminate the effectiveness of the inner spring. Consequently, the degree of play which is provided for different spring adjustments is accordingly limited, and it is not possible to only work with the outermost situated helical spring.

SUMMARY OF THE INVENTION

Therefore, there is still present a real need in the art for a door closing mechanism of the mentioned type which is not associated with the drawbacks of the prior art constructions. Hence, a primary objective of the instant invention is to provide just such type door closure mechanism which effectively and reliably fills the existing need in the art and overcomes the aforenoted disadvantages inherent in the prior art door closure structures.

Another more specific objective of the instant invention is to provide a door closing mechanism of the previously mentioned type which is better than similar type door closures of the prior art.

Still a further significant object of the instant invention is to provide a door closure mechanism utilizing a fluid brake, wherein there is afforded a wide degree of adjustment of the bias or stress of the spring means used in such door closing mechanism, the adjustment itself being carried out in an extremely simple, rapid and easy manner.

Yet a further significant object of the instant invention is to provide an improved type of door closure mechanism of the character under consideration, which is relatively economical to manufacture, easy to use and adjust, not readily subject to breakdown, and requires a minimum of servicing and maintenance.

Now, in order to implement these and still further objects of the invention, which become more readily apparent as the description proceeds, the inventive door closing mechanism is generally manifested by the features that the rod is equipped with at least one support means, more precisely a support pin, for the spring, and this support pin extends betweenn the coils or windings of the helical spring.

BRIEF DESCRIPTION OF THE DRAWING

The invention will be better understood and objects other than those set forth above, will become apparent when consideration is given to the following detailed description thereof. Such description makes reference to the annexed drawing wherein the single figure shows a longitudinal sectional view of a preferred embodiment of inventive door closing mechanism.

DETAILED DESCRIPTION OF THE PREFERRED EMBODIMENT

Describing now the drawings, the exemplary embodiment of door closing mechanism under consideration will be seen to comprise a substantially cylindrical housing 1 equipped with attachment flanges 2, by means of which this housing 1 can be attached to a non-illustrated door wing such that the lengthwise axis of the housing extends horizontally. Both ends of the housing 1 are closed by cover members 4 and 5 through agency of sealing O-rings 3. More precisely, it will be noted that each cover member 4 and 5 is equipped with external threading by means of which it is threaded into appropriate internally threaded end portions of the housing 1. Further, an inner tube 6 is mounted at both cover members 4 and 5 coaxially with respect to the housing 1. The end plug or pin 6a of the inner tube 6 is axially retained by means of a flange at the cover member 4 and is sealed by means of a sealing O-ring 7.

Continuing, it will be observed that within the inner tube 6 there is arranged a throttle mechanism 9 having a through-flow opening 9a with which cooperates a needle valve 10. Needle valve 10 is provided with a terminal portion constructed as a threaded head 10a which is threadably connected with the cover member 5. The throttle mechanism 9 and the needle valve 10 are fabricated from such heat sensitive material that the free through-passage opening 9a of the throttle mechanism 9 increasingly narrows, and vice versa, in accordance with the increasing temperature of the fluid medium, typically oil, located within the internal space of the inner tube 6 and as a function of the change in viscosity of such oil. A sealing ring 11 prevents the escape of oil along the needle valve head 10a. A transverse slot 10b provided at the needle valve head 10a, serving for the insertion of a screwdriver or other suitable tool, renders possible adjustment of the needle valve 10 and, therefore, variation of the effective through-passage opening of the throttle mechanism.

By further referring to the drawing it will be recognised that a substantially hollow cylindrical piston member 12 is guided within the housing 1. The piston member 12 which encloses the inner tube 6 at a radial spacing, further will be seen to be sealed with respect to the inner tube 6 at the side confronting the cover member 5, by means of a sealing ring 13 serving as a double-acting piston floor or bottom portion. By virtue of this arrangement the housing space surrounding the inner tube 6 is sub-divided by means of the piston floor 13 into two separate cylinder compartments 14 and 15. The inner space or compartment of the inner tube 6 communicates to one side of the throttle mechanism 9, via a radial wall opening 16 at the end region of the inner tube 6, with the cylindrical compartment or space 14, and at the other side of the throttle mechanism 14 the inner space of this inner tube 6 communicates via a radial wall opening 17 at the other end of the inner tube, with the cylindrical compartment 15.

Additionally, it will be seen that two coaxially arranged helical compression or pressure springs 18 and 19, functioning as closing springs for the door, are arranged in the cylindrical compartment 14. The radial outer closing spring 18 bears at one end against the cover member 4 and at the opposite end against the corresponding end face of the piston member 12. On the other hand, the closing spring 19 which is situated radially more inwards bears at one end against a shoulder 12a of the piston member 12. The other support or bearing location for this spring 19 will be described hereinafter. The weaker relatively long inner spring 19 is guided by means of the inner tube 6 so that there is rendered impossible a mutual hindering of both springs 18 and 19. Further, auxiliary openings 20 are provided at a small spacing from the wall opening 17 of the inner tube 6. Depending upon the position of the piston member 12 these auxiliary openings 20 serve to flow communicate the inner compartment of the inner tube 6 at the side of the needle valve with the one or the other of both cylindrical compartments 14 and 15.

The piston member 12 is equipped along its outer surface over a portion of its length with teeth means 21 forming a gear rack. A gear 22 meshes with this gear rack 21, the axis of rotation of gear 22 being disposed perpendicular to the lengthwise axis of the housing 1. Moreover, gear 22 is rotatably mounted within an additional or auxiliary housing 1a provided laterally of the main housing 1. A non-illustrated lever is attached in any suitable known manner to the gear 21, at the free end of this lever there is articulated a non-illustrated, yet conventional pull or traction rod, the armature of which, for instance, can be secured to the door frame, whereas the attachment flanges 2 of the housing 1 are screw connected or otherwise attached to the door wing, and in such a manner that the axis of the housing 1 is horizontally disposed and the axis of the auxiliary housing 1a is vertically disposed. With the same orientation of the housing axes the same door closing mechanism can also be arranged such that the previously mentioned armature of the traction or pull rod is secured to the door wing and the housing 1 to the door frame. The manner of attachment is not crucial insofar as the invention is concerned since such will readily be understood by those versed in the art.

What has been described up to the present with regard to the specific construction of the door closing mechanism constitutes subject matter which is known in the art. There will now be detailed the novel components of the inventive door closing mechanism and the mode of operation thereof in conjunction with the remainder of the assembly, as well as describing some of the advantages afforded by the inventive construction.

Now, by referring to the drawing again it will be recognised that the invention contemplates the hollow tube or rod 6 is pierced by a support member, here shown in the form of a support pin 23, this pin can be, for instance, pressed into the tube or rod. Pin 23 possesses the same inclination with regard to the lengthwise axis of the rod or tube 6 as the coils or windings of the inner spring 19. Further, the opposed ends of the pin 23 which extend past the outer surface of the rod 6 bear against the neighboring windings of the helical or spiral spring 19. Rod or tube 6 can be rotated from externally of the housing 1 by means of a slot 24, into which there can be inserted for instance a screwdriver or other appropriate tool, rotation of rod 6 can be selectively carried out in one or the other direction. In so doing, the inner spring 19 will screw itself axially either in the one or other direction. Hence, the pin member 23 which can be screwed into the spring windings or coils therefore replaces the threading of the rod of the known door closing mechanisms as well as the nut member which is threadable upon such threaded rod. With the novel construction of inventive door closing mechanism and the herein proposed solution for adjusting the spring bias it is possible to obtain a considerably greater adjustment range. The inner surface of the housing cover member 4 is equipped with a number of, for instance four recesses or notches 25 which are distributed about the periphery of such cover member. If the rod 6 is rotated such that the spring 19 moves to the left of the drawing, then, the left end of such spring will snap into one of these recesses 25 and the spring 19 is therefore ridgedly supported for rotation at such engaged end at the housing arrangement 1, 4. If the rod 6 is rotated further in the same rotational sense, then, always more of the spring windings will be brought into the uniformly remaining space between the cover member 4 and the pin 23, in other words, an increasing amount or portion of the spring 19 will be stored within this region. Yet, the portion of the spring 19 which is decisive for the action of the door closing mechanism is situated between the shoulder 12a and the pin 23. This means that the spring 19 will be supported at its left end region at the pin 23. This support location defined by the support pin 23 remains unchanged as viewed in the lengthwise direction of the housing 1. As more and more of the spring coils or windings of the spring 19 are brought into the area between the support pin 23 and the confronting cover member 4 there is achieved the same effect for the door closing mechanism as if continuously the length of the spring, that is, the number of resilient windings, had been decreased. The portion of the spring 19 disposed between the shoulder 12a and the pin 23 can be therefore shortened in this manner such that when the door closing mechanism is in operation the spring 19 no longer comes into effect at all, in other words that its function is completely eliminated, and only the outer spring 18 is still operable. The total length of the spring 19 and the spacing of the pin 23 from the cover member 4 as well as the thickness of the windings or coils of the spring 19 can be appropriately designed in such a manner that at the region between the pin 23 and the cover member 4, when the spring windings contact one another, the spring 19 becomes ineffectual during operation of the door closing mechanism.

Now if the rod 6 is rotated in the other direction, for instance through insertion of a screwdriver into the slot 24, then the spring 19 will be moved towards the right. Hence the left-situated end portion of the spring 19, as the spring 19 is relaxed, then comes out of engagement with the recess 25. Before the spring 19 at the left side comes out of engagement with the cover member 4 the right side of the spring located at the piston floor 12a comes into engagement with a non-illustrated recess which is similar to the recess 25, and therefore not particularly shown, so that the spring 19 once again is supported so as to be non-rotatable. Spring 19 can then be moved further towards the right until the left end of the spring 19 bears against the support pin 23. The total spring 19 now is disposed between the pin 23 and the shoulder 12a. The stress or loading of the spring has thus become increasingly greater and during functioning of the door closing mechanism the spring 19 has maximum effect together with the spring 18.

Now by virtue of the fact that owing to movement of the spring 19 towards the left by appropriately rotating the rod member 6 it is possible to render ineffectual the entire spring 19 during operation of the door closing mechanism, in other words the door closing mechanism only then functions with the spring 18 effective, it is possible for a predetermined closing force to design the spring member 18 so that it is stronger than was heretofore the case. In fact, the spring 18 can be constructed to be stronger by the amount corresponding to the force which was previously applied in the prior art door closing mechanisms by the spring 19 which could not be completely rendered ineffectual. As a result a larger closing force is available for heavier doors, namely a force composed of the force of the stronger spring 18 in addition to the force of the spring 19.

Previously in order to adjust the spring 19 it was necessary to cut a threading upon the rod 6 and additionally it was required to provide a nut member serving as the support location for the left end of the spring 19. Now with the inventive construction of door closing mechanism instead of the prior art threading and nut member is explained above, it is only necessary to provide the supporting pin 23. The proposed solution of the invention is considerably cheaper, and additionally, provides a considerably greater adjustment range for the spring 19 as explained above.

Now by way of completeness there will be explained hereinafter the mode of operation of the door closing mechanism designed according to the teachings of the present invention. In the drawing the components of the door closing mechanism are depicted in such a position that the movable components or elements have assumed a position which corresponds to that position of the mechanism directly prior to closing of the door. Hence, the piston 12 is located directly in front of its right terminal position and the springs 18 and 19 are relaxed substantially to the maximum extent corresponding to the undertaken adjustment of the spring 19. Upon opening the door the previously mentioned conventional and therefore non-illustrated pull rod of the likewise conventional lever arm rocks or pivots in such a manner that the gear 22 is rotated in counter-clockwise direction. The gear 22 which engages with the rack 21 therefore displaces the piston member 12 towards the left, resulting in loading of the springs 18 and 19. The oil located within the cylindrical compartment 14 is displaced by the action of the piston member 12 through the wall opening 16 into the inner tube or rod 6 and arrives via the throttle mechanism 9, through the wall openings 17 at the other end of the tube 6, into the cylindrical compartment 15. However, since especially during rapid opening of the door a damming up of the escaping oil is caused by the throttle mechanism 9 the oil tends to seek the path of least resistance defined by an opening between the inner shoulder 12a and the sealing ring 13 on the one hand, and the inner tube 6 and the sealing ring 13 on the other hand. If the opened door is released, then, the springs 18 and 19 again displace the piston member 12 towards the right. The sealing ring 13, which is loosely retained at the piston member 12 and acts as a so-called relief or check valve, is displaced against the inner shoulder 12a so that, in this case, there is no throughflow of oil. Thus the oil will be displaced from the cylindrical compartment 15 through the openings 17, 20 into the inner tube or rod 6 and via the throttle mechanism 9 and the wall opening 16 into the cylindrical compartment 14. This axial displacement of the piston member 12 brings about, through the agency of the gear rack 21, a rotation of the gear 22 in clockwise direction so that the previously mentioned lever arm will be correspondingly rocked or pivoted and the pull or traction rod will pull the door into its closed position. Shortly prior to reaching the corresponding end position, that is, after the piston floor or bottom 13 passes the openings 20 these openings 20 then place in flow communication the cylindrical compartment 15 directly with the cylindrical compartment 14, while by-passing the throttle mechanism 9, which leads to the so-called terminal or final impact in that the dampening or throttling action brought about by the needle valve-control throttle mechanism 9 is removed. Owing to the threaded mounting of the needle valve 10 as explained above, it is possible to vary the dampening or throttling action of the throttle mechanism 9. Instead of using the pin 23 as the support means, it would be possible to also use a single plug which radially depends from the rod 6. Furthermore, the helical springs 18 and 19 can be wound so as to be left-handed or right-handed.

While there is shown and described present preferred embodiments of the invention, it is to be distinctly understood that the invention is not limited thereto but may be otherwise variously embodied and practiced within the scope of the following claims. Accordingly, what is claimed is:

1. A door closing mechanism of the type incorporating a fluid brake, comprising: a housing; a piston member displaceably mounted within said housing; at least one helical spring for displacing said piston member, said helical spring being capable of acting in compression to resist displacement of said piston member; a rotatable rod located within said helical spring; means for adjusting said helical spring along said rod, said adjusting means comprising at least one support means for said helical spring provided on said rod, said support means extending between the windings of said helical spring and being spaced from, and between the ends of said helical spring, dividing said helical spring into two portions, whereby rotation of said rod moves coils of said helical spring from one of said portions to another of said portions, thereby changing the displacing force exerted by said helical spring on said piston member.

2. The door closing mechanism as defined in claim 1, wherein said support means comprises a support plug.

3. The door closing mechanism as defined in claim 2, wherein said support plug is in the form of a pin member which piercingly extends completely through said rod such that both opposed ends of said pin member protrude past the surface of said rod, said pin member being inclined at substantially the same angle as the windings of said helical spring with respect to the lengthwise axis of said rod.

4. The door closing mechanism as defined in claim 1, wherein said rod is constructed as a tubular member, means defining a throttling location for a fluid medium located within said tubular member.

5. The door closing mechanism as defined in claim 1, further including means for rotatably mounting said rod at both ends within said housing, and means provided for one end of said rod for enabling rotation of said rod from externally of said housing.

6. The door closing mechanism as defined in claim 5, wherein said rotation enabling means comprises at least one slot provided at said one end of said rod.

7. The door closing mechanism as defined in claim 1, wherein said housing incorporates a housing closure portion having an end face confronting an end of said helical spring, said end face being provided with at least one recess means for the form-locking, detachable engagement of said spring end.

8. The door closing mechanism as defined in claim 1, further including a second helical spring, both of said helical springs being arranged within one another, said support means only extending between the windings of the innermost located helical spring.

References Cited

UNITED STATES PATENTS

| | | | |
|---|---|---|---|
| 627,828 | 6/1899 | Page | 16—62 |
| 2,265,629 | 12/1941 | Christiansen | 267—175 |
| 2,698,160 | 12/1954 | Hansen | 267—175 X |
| 3,000,043 | 9/1961 | Check | 16—64 |
| 3,365,194 | 1/1968 | Strickland, Jr. | 267—177 X |
| 1,788,373 | 1/1931 | Anderson | 267—177 X |
| 3,155,109 | 11/1964 | Anthon | 267—177 X |
| 1,178,688 | 4/1916 | Stronach | 16—62 |
| 1,123,810 | 1/1915 | Shaw | 16—62 |

FOREIGN PATENTS

| | | | |
|---|---|---|---|
| 563,103 | 11/1932 | Germany | 16—52 |
| 394,242 | 10/1932 | England | 267—166 |

FRANCIS K. ZUGEL, Primary Examiner

P. A. ASCHENBRENNER, Assistant Examiner

U.S. Cl. X.R.

16—52, 72, 85